United States Patent [19]

Palacio et al.

[11] Patent Number: 4,525,972
[45] Date of Patent: Jul. 2, 1985

[54] TRUSS ASSEMBLY AND BRACING CLIP AND ATTACHMENT MEMBER FOR USE WITH TRUSSES

[75] Inventors: Joaquin J. Palacio; Carlos C. Cristobal, both of Miami, Fla.

[73] Assignee: Gang Nail Systems, Inc., Miami, Fla.

[21] Appl. No.: 423,252

[22] Filed: Sep. 24, 1982

[51] Int. Cl.³ .............................................. E04C 3/02
[52] U.S. Cl. ........................................ 52/643; 52/652; 52/702; 52/714; 403/232.1; 403/386
[58] Field of Search ................. 52/693, 694, 695, 696, 52/702, 712, 691, 692, 92, 643, 650, 665, 714; 403/232.1, 283, 406, 386, 217; 411/466

[56] References Cited

U.S. PATENT DOCUMENTS

| | | |
|---|---|---|
| 625,427 | 5/1899 | Stewart et al. ............... 52/702 |
| 666,918 | 1/1901 | Butz ........................... 242/300 |
| 829,234 | 8/1906 | Seipp .......................... 52/702 |
| 844,212 | 2/1907 | Thaden ........................ 52/643 |
| 1,418,699 | 6/1922 | Collins ....................... 403/405 |
| 2,877,520 | 3/1959 | Juriet ......................... 403/283 |
| 3,036,347 | 5/1962 | Findleton ..................... 52/289 |
| 3,103,262 | 9/1963 | Handley ....................... 52/693 |
| 3,172,507 | 3/1965 | Blyuies ....................... 52/643 |
| 3,298,151 | 1/1967 | Juriet ......................... 52/644 |
| 3,503,173 | 3/1970 | Juriet ......................... 52/693 |
| 3,667,786 | 6/1972 | Cooper ........................ 52/714 |
| 3,853,162 | 12/1974 | Menge ......................... 52/691 |
| 3,882,653 | 5/1975 | Ollman ........................ 52/694 |
| 4,022,537 | 5/1977 | Gilb et al. ................... 52/665 |
| 4,078,352 | 3/1978 | Knowles ....................... 52/693 |
| 4,106,257 | 8/1978 | Gilb ........................... 52/693 |
| 4,160,350 | 7/1979 | Craib .......................... 403/405 |
| 4,207,719 | 6/1980 | Knowles ....................... 52/693 |

*Primary Examiner*—John E. Murtagh
*Attorney, Agent, or Firm*—LeBlanc, Nolan, Shur & Nies

[57] ABSTRACT

A truss assembly and truss hanger, bracing clip and attachment member for use with trusses is disclosed. The bracing clip is used for supporting a beam running transverse to a plurality of wooden trusses and includes a connector plate disposed within a first plane having a plurality of sharp projections extending generally perpendicular from the plane of the plate for use in fixedly attaching the connector plate to the top wooden member of the truss, a first surface attached to and extending from the connector plate generally within the first plane, a second surface disposed within a second plane which is attached to the first surface and forming approximately a 90° angle with the first surface, the second surface being parallel to the longitudinal axis of the beam when the second surface is in contact with the beam, a third surface disposed within a third plane which is joined to the second surface and forming approximately a 90° angle with the second plane, the third surface being substantially perpendicular to the first plane, and the third surface being adapted for attachment to said beam underneath and across its thickness.

13 Claims, 7 Drawing Figures

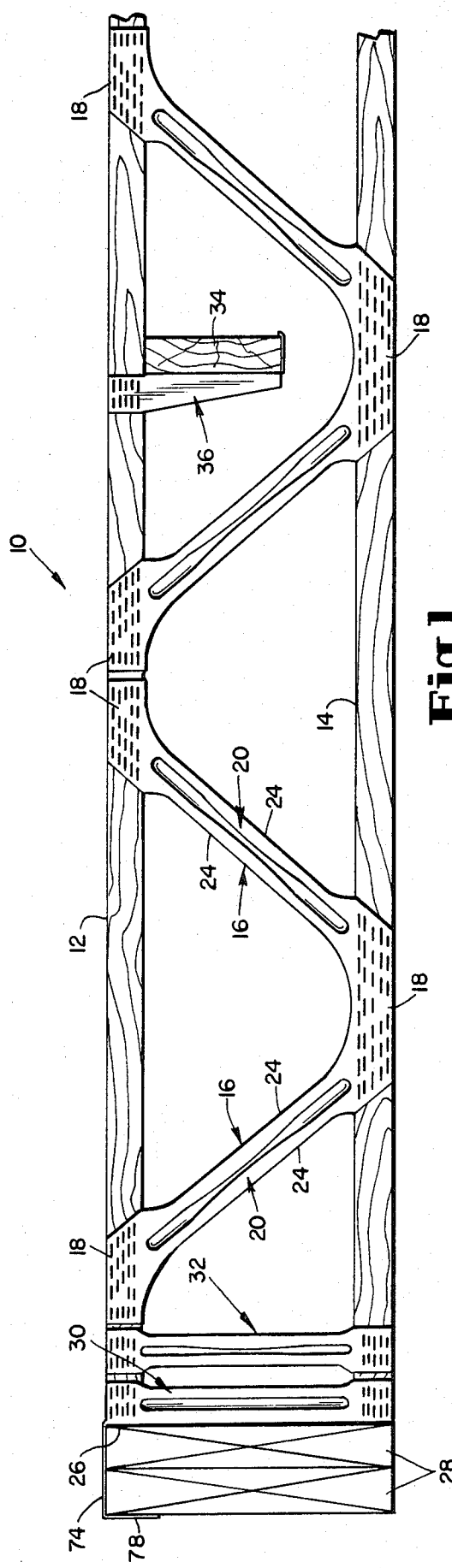
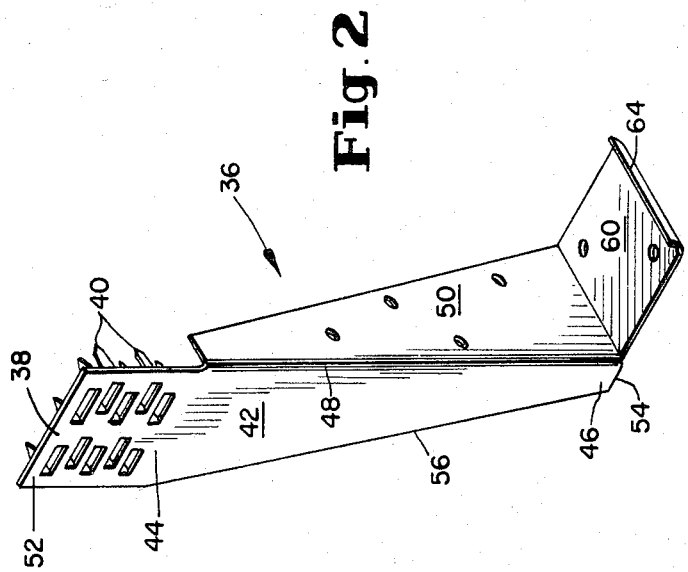
Fig.1
Fig.2

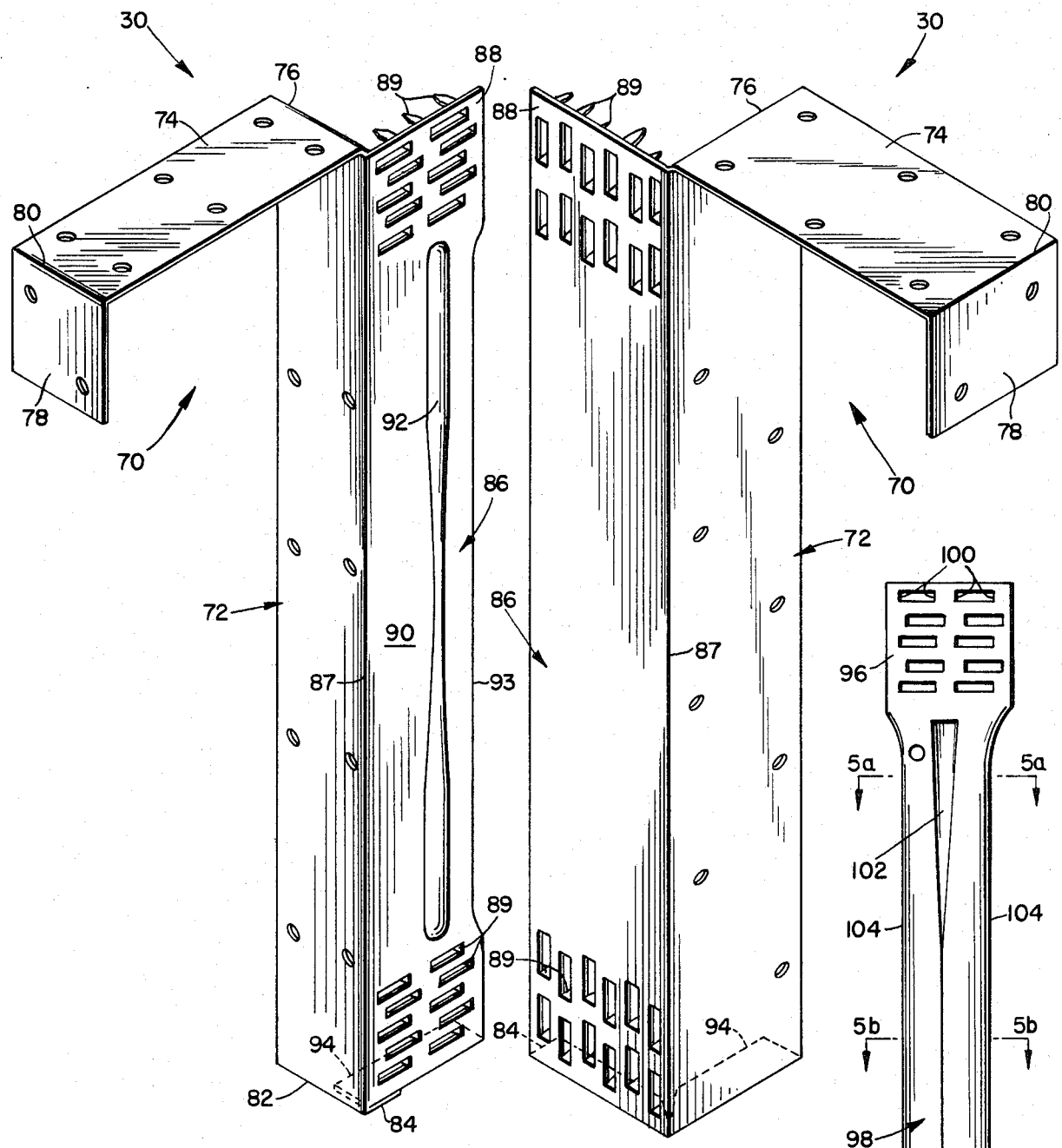

TRUSS ASSEMBLY AND BRACING CLIP AND ATTACHMENT MEMBER FOR USE WITH TRUSSES

CROSS REFERENCE TO RELATED APPLICATIONS

U.S. patent application Ser. No. 337,671 now U.S. Pat. No. 4,485,606 entitled Truss Structures Constructed With Metal Web Members filed on January 7, 1982 which names Robert Gottlieb as the inventor and which is assigned to the assignee of the present invention, discloses trusses and metal brackets which may be used for constructing trusses in accordance with the present invention. This application is incorporated herein by reference.

BACKGROUND OF THE INVENTION

1. Field of the Invention

The present invention relates to wooden trusses used for supporting structural loads and to hardware used in constructing wooden trusses which enhances the ease of installation and increases the resultant structural rigidity of the installed trusses for bearing structural loads.

2. Description of the Prior Art

In constructing various types of wooden truss assemblies, including both roof trusses and floor joists, it has been common to use large wooden structural members such as 2"×10"s. Such large wooden members, however, are becoming increasingly difficult to obtain and have increased in cost substantially. Consequently various alternatives have been sought for enabling the construction of trusses which are able to bear the structural loads of full dimension lumber but which are constructed from smaller pieces of dimension lumber such as 2"×4" members which are spaced apart by metal connectors. Substitutes for full dimension lumber roof trusses and floor joists must satisfy two primary criteria. First, the trusses must be able to withstand large compressive loads so that they may be used for bearing substantial structural loads. Secondly, it is desirable that the trusses be prefabricated at a manufacturing plant at a low labor cost and shipped to a building site without a high degree of risk of incurring damage to the trusses.

Various types of hardware have been developed for making prefabricated trusses. U.S. Pat. Nos. 3,025,577 to Jureit, 3,298,151 to Jureit and 4,078,352 to Knowles and the aforementioned U.S. Ser. No. 337,671 are representative of metal connectors which have been used for manufacturing trusses from dimension lumber such as 2"×4"s.

The aforementioned U.S. patent application Ser. No. 337,671 entitled Truss Structures Constructed With Metal Web Members filed on January 7, 1982 discloses a metal web member which has a reinforced leg having a projection which runs substantially the entire length of the leg and which projects in the direction of the sharp projections of connecting plates disposed at the ends of the legs. The height of the projection varies from a maximum in proximity to the connecting plates to a minimum in proximity to the midpoint between the connecting plates. A pair of flanges are joined to the outside edges of the leg along the length of the leg which flanges project in the direction of the sharp projections of the connecting plates. The height of the projection of the flanges varies from a minimum in proximity to the connecting plates to a maximum in proximity to the midpoint between the connecting plates. A pair of projections at each end of the legs may be used in place of the single projection which extends the length of the leg.

Attachment members have been marketed for connecting together the spaced apart wooden members which are used for constructing trusses. These attachment members have first and second connecting plates disposed at opposite ends of an intermediate section which extends transversely between the ends of of the spaced apart first and second wooden member of the truss. The intermediate section of the aforementioned attachment members contains a plurality of ridges which project outward away from the direction that the sharp projections in the connecting plates project when engaging the spaced apart first and second wooden members of the truss.

Trusses have been installed at the building site in a number of ways. If the trusses are being used to construct a floor, they may be laid on top of the foundation walls and nailed into a beam which extends perpendicular to the longitudinal axis of the trusses. The trusses have been nailed in place by toenailing through various surfaces of the wood at the end of the truss.

It has been found that trusses of long length have the property of flexing to an undesirable extent if the center between the ends of the truss is not braced with a transverse beam when heavy structural loads are placed near the center. Thus, while it is the case that trusses manufactured at factory sites have eliminated the need for using expensive full dimension lumber, it is nevertheless the case that to some extent they have the property of undesirable flexation when they are used for long spands in supporting heavy structural loads.

SUMMARY OF THE INVENTION

It is an object of the invention to provide an improved truss assembly which has increased rigidity in proximity to unsupported sections which are subject to large amounts of flexation.

It is a further object of the invention in providing increased rigidity in proximity to the unsupported section of the truss assembly to provide a mechanism for attaching a beam running transverse to the longitudinal axis of the trusses for supporting the unsupported sections of the truss assembly.

It is a further object of the invention to provide an attachment member which may be secured transverse to the longitudinal axis of the spaced apart upper and lower wooden members to provide increased rigidity and resistance to twisting and compression.

The invention includes a bracing clip for use in supporting a beam running transverse to a plurality of spaced apart wooden members such as those found in trusses, and an attachment member for connecting together the spaced apart wooden members of the truss and truss assembly using the aforementioned bracing clips and attachment members.

The bracing clip is a mechanism for rigidly attaching a supporting beam running transverse to a wooden member such as the wooden members found in trusses. When the bracing clip is used in conjunction with a plurality of spaced apart trusses which are supporting a heavy structural load, it is attached to a beam running transverse to the longitudinal axis of the trusses disposed between the spaced apart wooden members of each truss to provide increased structural support to minimize undesirable flexation consequent from the bearing of the heavy structural load.

An attachment member in accordance with the invention provides a mechanism for connecting together the ends of the wooden members within individual trusses to provide increased rigidity and resistance to compression and torsional loading which could cause the upper and lower wooden members within the truss to twist with respect to each other. The attachment member may also be used to couple together other types of spaced apart wooden members other than those found in trusses.

A bracing clip for use in supporting a beam running transverse to a wooden member in accordance with the invention includes a connector plate disposed within a first plane having a plurality of sharp projections extending generally perpendicular from the plane of the plate for use in fixedly attaching the connector plate to the top wooden member of the truss; a first surface attached to and extending from the connector plate within the first plane; a second surface disposed within a second plane which is attached to the first surface and forming approximately a 90° angle with the first surface, the second surface being parallel to the longitudinal axis of the beam when the second surface is in contact with the beam; a third surface disposed within a third plane which is joined to the second surface and forming approximately a 90° angle with the second plane, the third surface being substantially perpendicular to the first plane; and the third surface being adapted for attachment to the beam underneath and across its thickness.

The bracing clip may also include a forth surface disposed in a fourth plane which is joined to the third surface at approximately a 90° angle; the fourth plane being substantially parallel to the second plane and projecting in the same direction as the second surface toward the connector plate.

The second and third surfaces may have a plurality of apertures adapted for receiving nails to secure the second and third surfaces respectively into engagement to the width and bottom of the beam.

In its preferred form, a bracing clip in accordance with the invention is tapered in width from a maximum width to a minimum width, the point of attachment of the first surface to the connector plate being the maximum width of the first surface and the end of the first surface farthest from the point of attachment being the minimum width; and the second surface is tapered in width from a maximum width to a minimum width, the maximum width of the second surface being located in proximity to the minimum width of the first surface and the minimum width of the second surface being located in proximity to the maximum width of the first surface.

An attachment member in accordance with the invention which is adapted for connecting two pieces of spaced apart wood together includes first and second connecting plates disposed at opposite ends of an intermediate section, the connecting plates each having a plurality of sharp projections extending generally perpendicular from the plane of the connecting plates, the connecting plates being disposed in the same general plane; the intermediate section having at least one projection projecting from the same side as the sharp projections of the connecting plates and extending substantially the entire length of the intermediate section between the connecting plates, the projection being highest in proximity to the connecting plates and lowest at its center located midway between the connecting plates and a pair of side flanges attached to and projecting upward from the outside edges of the intermediate section and extending in the same direction as the projection, the height of the projection of the side flanges varying throughout their length with the lowest projection being in proximity to the connecting plates and the highest projection being in proximity to the mid-point of the flanges located between the connecting plates. In the preferred form of the invention, the maximum projection of each of the flanges is at least approximately ⅓ of the width of the intermediate section.

BRIEF DESCRIPTION OF THE DRAWINGS

FIG. 1 is a end view of a truss assembly in accordance with the invention which illustrates the use of the truss hanger, bracing clip and attachment member;

FIG. 2 is an isometric view of a bracing clip in accordance with the invention;

FIG. 3(a) is an isometric view of a truss hanger in accordance with the invention;

FIG. 3(b) is an isometric view of a modification of the truss hanger of FIG. 3(a).

FIG. 4 is a top view of an attachment member in accordance with the invention;

FIG. 5(a) is a sectional view of the top view of FIG. 4 taken along section line 1—1 and;

FIG. 5(b) is a sectional view of the attachment member of FIG. 4 taken along section line 2—2.

DESCRIPTION OF THE PREFERRED EMBODIMENTS

FIG. 1 illustrates an end view of a truss 10 in accordance with the present invention which is supported at both its ends and carries a structural load of sufficient magnitude to cause an undesirable amount of flexing in the middle of the truss between the points of attachment of its end. The truss 10 is manufactured from an upper wooden member 12 and a lower wooden member 14 which may be made from standard dimension lumber such as a 2"×4" which is turned on its side so that the width of each 2"×4" within a truss is parallel to the horizontal. The upper wooden member 12 and the lower wooden member 14 are fixedly attached to a plurality of metal web members 16 which may be of any known construction but which preferably are those which are described in the aforementioned U.S. Ser. No. 337,671. Each of the metal web members 16 has three connecting plates 18 from which have a plurality of sharp teeth-like projections which are pressed into the wood members 12 and 14 to completely embed the projections into the wood to securely attach the metal web member to the upper and lower wooden members. While the design of the sharp teeth like projections is not part of the present invention, preferably they are manufactured in accordance with the teachings of U.S. Pat. No. 4,343,580 which is owned by the assignee of the present invention. A pair of intermediate sections 20 connects the connecting plate 18 at the vertex with the connecting plates at the ends. The cross-section of the intermediate section has been specifically designed to provide increased structural rigidity against compression and twisting consequent from the application of high structural loads to the truss and is described in the aforementioned Ser. No. 337,671. Each intermediate section 20 has one or more projections extending substantially along its entire length which project in the direction of the sharp teeth like projections of the connecting plates 18. Each projection is higher and wider in proximity to the connecting plates 18 than at the midpoint located between the connecting plates. Each intermediate section has a pair of side flanges 24 located on the outside edges which project in the same direction as the sharp teeth like projections of the connecting plates 18. The lowest projection of the side flanges 24 occurs in proximity to the connecting plates 18 and the highest projection occurs in proximity to the mid-point between the connecting plates. Each truss is supported at its ends 26 by a pair of truss end supporting beams 28 which run transverse to the longitudinal axis of the trusses. While it is common practice to support trusses with wooden beams in modern construction, it should be clearly understood that the invention is not limited to the use of wooden truss end supporting beams 28 and in fact may be used with any truss end supporting structure having a rectilinear cross-section. The truss 10 is connected to the truss end supporting beams 28 by means of a truss hanger 30 which is described in detail in FIGS. 3(a) and 3(b) infra. The ends of the upper wooden member 12 and the lower wooden member 14 are braced with an attachment member 32 which is attached adjacent to the point of attachment of the truss hanger 30. The attachment member is described in detail infra in conjunction with FIGS. 4, 5(a) and 5(b). One or more intermediate beams 34 provide further structural support for the truss 10 against large structural loads. Each of the beams extends transverse to the longitudinal axis of the individual upper and lower wooden members 12 and 14. The intermediate beams 34 are located between the upper and lower wooden members 12 and 14 and are fixedly attached to the upper member by means of a bracing clip 36 which is described infra in detail in FIG. 2. The function of the bracing clip 36 is to securely attach the intermediate beams 34 to the truss 10. It should be understood that the other side of the truss of FIG. 1 has a corresponding truss hanger 30, attachment member 32, and bracing clip 36 so that in actuality each truss has left and right hand versions of each of these elements for providing the maximum degree of performance.

FIG. 2 is an isometric view of a bracing clip in accordance with the present invention. The bracing clip 36 has a connecting plate 38 which has a plurality of sharp projections 40 projecting generally perpendicularly from the plane of the connecting plate. The projections may be made in accordance with the teachings of the aforementioned U.S. Pat. No. 4,343,580. The projections 40 are adapted to attach the connecting plate 38 to the upper wooden member 12 of the truss illustrated in FIG. 1 but may be used alternatively to connect a beam to any wooden member from which it is desired to support the beam transverse to the longitudinal axis of the wooden member. A first surface 42 is disposed in a first plane and is attached to the connecting plate 38 and extends in the same plane of the connecting plate. The first surface 42 has its maximum width 44 adjacent to the point of attachment with the connecting plate 38 and its minimum width 46 located at the other end farthest from the connecting plate. Preferably, the first surface is a tetrahedron having an side 48 which extends along the entire length of the first surface and which forms the point of attachment with a second surface 50 to be described infra. The second and third sides 52 and 54 of the tetrahedron, respectively, correspond to the maximum width 44 and the minimum width 46. The sides 52 and 54 are parallel to each other. The fourth side 56 extends between the second and third sides 52 and 54. The first and fourth sides subtend an acute angle. The second surface is disposed in a second plane and is attached to the first surface along the first side 48 to form an approximate 90° angle therewith. The second surface is a tetrahedron and has a shape similar to the first surface. A plurality of apertures are contained in the second surface 50 for facilitating the attachment of nails to the width of the beam 34 which is supported by the bracing clip 36. The plane of the second surface extends parallel to the longitudinal axis of the beam which is supported by the bracing clip 36 and extends in the same direction as the projections 40. A third surface 60 which is disposed in a third plane is joined to the second surface 50 and forms an approximate 90° angle with the second plane. The third surface 60 is substantially perpendicular to the first plane and is parallel to the longitudinal axis of the intermediate beam 34. A plurality of apertures are provided in the third surface to facilitate the connection of the bracing clip to the intermediate beam which is being supported. A fourth surface 64, which is disposed in a fourth plane, is attached to the third surface 60 and forms approximately a 90° angle with the third surface and is substantially parallel to the second surface 50. The fourth surface 64 projects from its point of attachment to the third surface 60 toward the connecting plate 38. The fourth surface 64 is displaced from the second surface 50 by a distance which is preferably equal to the thickness of two inch standard dimension lumber used in construction (1.5 inches). The length of the second and third surfaces is substantially equal to the width of the lumber the bracing clip is designed to support. While the preferred use of the bracing clip is in conjunction with the attachment of intermediate support beams 34 to trusses 10 as described in conjunction with FIG. 1 supra, it should be clearly understood that the bracing clip may be used for supporting other wooden members.

The method of manufacturing the bracing clip 36 does not form part of the invention. It should be understood that any acceptable manufacturing process for stamping out the bracing clip as previously described may be used. A single blank of metal may be used as the starting point for fabricating of the bracing clip. Thereafter the clip is folded to form the previously described right angles, punches to form the apertures for providing nail holes, and further formed to produce the sharp projections 40.

FIGS. 3(a) and 3(b) are isometric views of truss hangers in accordance with the present invention. The truss hanger has a bracket 70 having a first leg 72 which is adapted to engage the side of the truss 10 and truss end supporting beam 28 across its width. A base 74 is joined at its first end 76 to the first leg 72 of the bracket 70. A second leg 78 is joined to the second end 80 of the base 74 at an approximate 90° angle. The second leg extends parallel to the first leg 72 and runs in the same direction as the first leg to form a three sided structure in conjunction with the first leg 72 and the base 74 which functions as a bracket 70 for securely attaching the truss to the truss end supporting beams 28. The second end 82 of the first leg 72 of bracket 70 has a support shelf 84 joined thereto at an approxmate 90° angle which functions as a support for the lower wooden member 14 of the truss 10 of FIG. 1. An attachment member 86 is joined to the edge 87 of the first leg 72 of the bracket 70 along its length. The attachment member 86 has a pair of connecting plates 88 located at the ends of the attachment member. The sharp projections of the connecting plates 88 are preferably manufactured in accordance with the aforementioned U.S. Pat. No. 4,343,580. The sharp projections 89 of the connecting plates are pressed into the sides of the upper and lower wooden members 12 and 14 to securely attach the hanger to the end 26 of the truss 10. The attachment member 86 has an intermediate section 90 which extends between the connecting plates 88. The intermediate section 90 may be either a flat piece of sheet metal (FIG. 3(b)) which has not been reinforced to increase its rigidity or it may have structural reinforcing elements incorporated therein (FIG. 3(b)). The preferred form of structural reinforcing elements are like those described in the aforementioned U.S. Ser. No. 337,671 for reinforcing the legs extending between the connecting plates described therein. When reinforcing elements are incorporated, one or more projections 92 are formed in the intermediate section 90 which project in the same direction as the sharp projections 89 of the connecting plates 88. The height of the aforementioned projection 92 varies such that it reaches its maximum height in proximity to the connecting plates 88 and reaches its minimum height in proximity to the mid-point located between the connecting plates. The cross-section of the projection 90 is identical to that illustrated infra in FIGS. 5(a) and 5(b) and therefore will not be described in detail in conjunction with FIG. 3. A single side flange 93 is formed in the intermediate section 90 on the outside edge thereof which is opposed to the first leg 72 of the bracket 70. The side flange 93 projects from the plane of the intermediate section 90 in the same direction as the projections 89 of the connecting plates 88. The height of the projection of the side flange 93 varies such that it reaches its maximum height at the mid-point between the connecting plates 88 and reaches its minimum height in proximity to the connecting plate 88. The variation in the height of the projection 92 and the side flange 93 is such that the width of the intermediate section is substantially constant along its length. Preferably, the maximum height of the flange is at least approximately ⅓ of the width of the intermediate section. The side flange 93 has a design like that illustrated in FIGS. 5(a) and 5(b) infra. The lower connecting plate 88 has a support shelf 94 attached thereto at an approximate 90° angle therewith. The support shelf 94 projects in the same direction as the projections 89 of the lower connecting plate 88 and functions to support the lower wooden member 14 of the truss 10. Preferably, a matched pair of left and right hand hangers 30 are used at each end 26 of a truss 10. The only difference between the left and right hand hangers is that the attachment member 86 is connected to the opposite longitudinal side of the first leg 72 of the bracket 70 so that the projections of the upper and lower connecting plates 88 face in opposite directions in the left and right hand hanger 30.

An attachment member 32 in accordance with the invention is illustrated in FIG. 4 and FIGS. 5(a) and 5(b). The attachment member 32 has a pair of spaced apart connecting plates 96 which are separated by an intermediate section 98. Each connecting plate has a plurality of sharp teeth like projections 100 which extend generally perpendicularly from the plane of the connecting plates 96. The projections 100 are preferably made in accordance with the teachings of U.S. Pat. No. 4,343,580. The intermediate section 98 has a cross sectional design which is similar to the cross sectional design of the legs which space apart the connecting plates in the aforementioned U.S. Ser. No. 337,671. A projection 102 extends substantially the entire length of the intermediate section 98. The projection 102 extends in the same direction as the projections 100 of the connecting plates 96.

FIGS. 5(a) and 5(b) which are respectively sectional views taken along section lines 5a—5a and 5b—5b of FIG. 4 illustrate the variation in the height of the projection 102 along its length. Specifically, the maximum height of the projection is obtained in proximity to the point of attachment of the intermediate section 98 to the respective connecting plates 96. The minimum height of the projection is reached in proximity to the mid-point of the intermediate section 98 located between the connecting plates 96. The height of the projection 102 varies uniformly along the length of the intermediate section 98 between the highest and lowest points.

A pair of side flanges 104 are located at the outside edges of the intermediate section 98 and extend substantially the entire length of the intermediate section 98. The side flanges 104 project in the same direction as the projections 100 of the connecting plates 96. FIGS. 5(a) and 5(b) illustrate the variation in the height of the side flanges 104 along the length of the intermediate section 98. The lowest projection of the side flanges 104 is reached in proximity to the point of attachment of the ends of the intermediate section 98 to the connecting plates 96. The highest projection of the side flanges 104 is reached in proximity to the mid-point of the intermediate section 98 located between the connecting plates 96. The variation in the height of the side flanges 104 between the minimum and maximum height varies uniformly along the length of the intermediate section 98. The width of the intermediate section 98 is uniform along its length. The projection 102 and the side flanges 104 function as a means for stiffening the attachment member to sufficiently increase the rigidity of the member for avoiding any bending under compressive loads.

As an alternative to a single projection 102 extending the entire length of the intermediate section, two small projections can be used with one projection being located at each end of the intermediate section 98. When two small projections are used, the extra metal that is not taken up in forming the projections in proximity to the midpoint can be used for forming deeper side flange 104 in the central portion of the intermediate section 98. Preferably, the depth of the side flange 104 is at least approximately ⅓ of the width of the intermediate section 98.

While the preferred use of the attachment member is to connect the upper and lower wooden members 12 and 14 within a truss 10, it should be clearly understood that the invention may be used to connect together spaced apart pieces of wood for any use.

While the invention has been described in terms of its preferred embodiments, it should be clearly understood that numerous modifications may be made thereto within departing from the spirit and scope of the invention as defined by the appended claims.

What is claimed is:

1. A bracing clip for use in connecting a beam to a wooden member with the longitudinal axis of the beam extending transversely to the longitudinal axis of the wooden member, said bracing clip comprising:
   (a) a connector plate disposed within a first plane having a plurality of sharp projections extending generally perpendicular from the plane of the plate for use in fixedly attaching the connector plate to the wooden member;

(b) a first side portion attached to and extending from the lower end portion of the connector plate, said side portion generally being within said first plane;

(c) a second side portion disposed within a second plane and attached to said first side portion and forming approximately a 90 degree angle with said first plane and extending in the same direction as said sharp projections of said connector plate, the surface of said second side portion being generally parallel to the longitudinal axis of the beam when the second side portion surface is in contact with the width of the beam, the upper end portion of said second side portion terminating below the level of the connector plate, thus allowing the connector plate to be fixed to the wooden member in face-to-face abutment therewith; and (d) a third portion disposed within a third plane and joined to said second portion along the lower end portion thereof and forming approxmately a 90 degree angle with the plane of said second portion, the third portion being substantially perpendicular to the first portion and the surface of said third portion being adapted for supporting said beam underneath and across its thickness.

2. A bracing clip in accordance with claim 1 further comprising:

a fourth portion disposed within a fourth plane which is joined to said third portion and forming approximately a 90 degree angle with the plane of said third portion, said fourth portion projecting toward the connector plate.

3. A bracing clip in accordance with claims 1 or 2, wherein said second and third portions each have a plurality of apertures adapted for receiving fasteners to secure said second and third portions, respectively, into engagement to the width and thickness of the beam.

4. A bracing clip in accordance with claim 1 or 2, wherein said first and second portions extend a distance which is substantially equal to the width of a beam with which the clip is used.

5. A bracing clip in accordance with claim 1 or 2, wherein:

(a) the first side portion is tapered in width from a maximum width to a minimum width, the point of attachment of the first side portion to the connector plate being the maximum width of the first side portion and the end of the side portion farthest from the point of attachment being the minimum width; and (b) the second side portion is tapered in width from a maximum width to a minimum width, the maximum width of the second side portion being located in proximity to the minimum width of the first side portion and the minimum width of the second side portion being located in proximity to the maximum width of the first side portion.

6. A bracing clip in accordance with claim 4, wherein:

(a) the first side portion is tapered in width from a maximum width to a minimum width, the point of attachment of the first side portion to the connector plate being the maximum width of the first side portion and the end of the side portion farthest from the point of attachment being the minimum width; and (b) the second side portion is tapered in width from a maximum width to a minimum width, the maximum width of the second side portion being located in proximity to the minimum width of the first side portion and the minimum width of the second side portion being located in proximity to the maximum width of the first side portion.

7. The bracing clip of claim 1, wherein said wooden member is comprised of a truss having top and bottom spaced apart wooden chords, the bracing clip being adapted for having the connector plate attached to the top wooden chord.

8. A wooden truss assembly comprising:

(a) a plurality of spaced apart wooden trusses which extend longitudinally in a first direction, each truss having an upper and a lower spaced apart member; and (b) a beam extending longitudinally in a direction transverse to the longitudinal direction of the plurality of spaced apart trusses, the beam being disposed between the upper and lower spaced apart wooden members of each truss, said beam being attached to the upper wooden member of said trusses by a bracing clip, said bracing clip comprising:

(i) a connector plate disposed within a first plane having a plurality of sharp projections extending generally perpendicular from the plane of the plate for use in fixedly attaching the connector plate to the wooden member;

(ii) a first side portion attached to and extending from the connector plate, said side portion generally being within said first plane;

(iii) a second side portion disposed within a second plane and attached to the first side portion and forming approximately a 90 degree angle with said first plane and extending in the direction of said sharp projections of said connector plate, the surface of said second side portion being parallel to the longitudinal axis of the beam when said second side portion is in contact with the beam;

(iv) a third portion disposed within a third plane and joined to said second side portion and forming approximately a 90 degree angle with the plane of said second side portion, the third portion being substantially perpendicular to the first portion, and the third portion being adapted for supporting said beam underneath and across its thickness.

9. A wooden truss assembly in accordance with claim 8, said bracing clip further comprising:

a fourth portion disposed within a fourth plane which is joined to said third portion and forming approximately a 90 degree angle with the plane of said third portion, said fourth portion plane being substantially parallel to said second portion plane and projecting toward the connector plate.

10. A wooden truss assembly in accordance with claims 8 or 9, wherein said second and third portions of said bracing clip each have a plurality of apertures adapted for receiving fasteners to secure said second and third portions, respectively, into engagement to the width and thickness of said beam.

11. A wooden truss assembly in accordance with claim 9 wherein said first and second portions of said bracing clip extend a distance which is substantially equal to the width of said beam.

12. A wooden truss assembly in accordance with claim 9 wherein:
  (a) the first portion of said bracing clip is tapered in width from a maximum width to a minimum width, the point of attachment of said first portion to the connector plate being the maximum width of said first portion and the end of said first portion farthest from the point of attachment being the minimum width; and
  (b) the second portion of said bracing clip is tapered in width from a maximum width to a minimum width, the maximum width of said second portion being located in proximity to the minimum width of said first portion and the minimum width of said second portion being located in proximity to the maximum width of said first portion.

13. A wooden truss assembly in accordance with claim 1 wherein:
  (a) the first portion of said bracing clip is tapered in width from a maximum width to a minimum width, the point of attachment of the first portion to the connector plate being the maximum width of said first portion and the end of said portion farthest from the point of attachment being the minimum width; and
  (b) the second portion is tapered in width from a maximum width to a minimum width, the maximum width of the second portion being located in proximity to the minimum width of said first portion and the minimum width of the second portion being located in proximity to the maximum width of the first portion.

* * * * *